United States Patent [19]

Motoyama et al.

[11] Patent Number: 4,785,759
[45] Date of Patent: Nov. 22, 1988

[54] APPARATUS FOR TREATING POWDERY AND GRANULAR MATERIAL

[75] Inventors: Shimesu Motoyama, Asaka; Siuri Yamada, Kawagoe; Narimichi Takei, Sugito; Koji Nagaka, Saitama, all of Japan

[73] Assignee: Freund Industrial Co., Ltd., Tokyo, Japan

[21] Appl. No.: 91,714

[22] Filed: Sep. 1, 1987

[30] Foreign Application Priority Data

Sep. 2, 1986 [JP] Japan ................................ 61-206305

[51] Int. Cl.$^4$ ................................................ B05C 5/00
[52] U.S. Cl. ........................................ 118/19; 118/20; 34/133
[58] Field of Search .......................... 118/19, 20, 303; 34/133, 139

[56] References Cited

U.S. PATENT DOCUMENTS 2,884,710  5/1959  Smith ..................................... 34/133
4,363,285 12/1982  Yoshida et al. ................... 178/20 X

FOREIGN PATENT DOCUMENTS 6150626  3/1986  Japan ..................................... 178/20

Primary Examiner—John McIntosh
Attorney, Agent, or Firm—Kane, Dalsimer, Sullivan, Kurucz, Levy, Eisele and Richard

[57] ABSTRACT

A powdery and granular material treating apparatus wherein a powdery or granular material is contained in a rotary drum and the rotary drum is rotated about a horizontal axis to thereby coat the powdery or granular material. Ventilating perforations are formed on the entire surface or portions of the outer periphery of the rotary drum and drying air is fed to or exhausted from the rotary drum through these ventilating perforations. This powdery and granular material treating apparatus includes: seal plates for sealing drying air fed into the rotary drum; circular sliding frames provided on the sides of the outer periphery of the rotary drum, the outer surfaces of said sliding frames being in sliding contact with the seal plates at portions, through which air is fed to or exhausted from the rotary drum; and partition plates provided on the side of the outer periphery of the rotary drum at positions spaced apart in the circumferential direction of the rotary drum from one another. The rotary drum, sliding frames, partition plates and seal plates are housed in an outer casing.

11 Claims, 5 Drawing Sheets

APPARATUS FOR TREATING POWDERY AND GRANULAR MATERIAL

BACKGROUND OF THE INVENTION

1. Field of the Invention

This invention relates to powdery and granular material treating technique, and more particularly to technique effectively applicable to coating of pharmaceutical preparations, food product and the like.

2. Related Art Statement

In general, the coating apparatuses of this type include ones wherein a plurality of ventilating portions are provided in the circumferential direction of a rotary drum called a coating pan, and drying air or the like is fed to or exhausted from the interior of the rotary drum through at least one of these ventilating portions and ducts communicated therewith by an air switching valve. An apparatus of this type is disclosed, for example, in U.S. Pat. No. 3,834,347.

On the other hand, as the coating apparatuses of another type, there are ones wherein a multiplicity of ventilating perforations are provided on the entire circumference of the outer periphery of the rotary drum and seals being in sliding contact with the outer periphery of the drum are also provided, whereby drying air or the like is fed into or exhausted from the rotary drum through these ventilating perforations. An apparatus of this type is disclosed, for example, in U.S. Pat. No. 3,573,966.

Now, according to the former technique, the area of the ventilating portions is restricted to some degree. Hence, in order to increase the drying capacity, it is necessary to increase the capacity of a ventilating means. Furthermore, this may result in making the construction of the ventilating portions and the air switching valve somewhat complicated.

Whereas, in case of the latter technique, the ventilating perforations are formed on the entire outer periphery, so that the ventilating capacity can be high, a satisfactory drying capacity can be obtained, the apparatus can be simplified in construction and costs can be reduced. However, in manufacturing the apparatus, punching process is used for forming the ventilating perforations, whereby burrs are formed on the surfaces of the drum during the punching. Because of this, when the burrs are formed on the inner surface of the drum, the material tumbling in the drum, such as tablets, are damaged, thus deteriorating the product quality. On the contrary, when the burrs are formed on the outer surface of the drum, a disadvantage is presented that the seals disposed at feeding-exhausting portions are damaged to cause gas leakage. Furthermore, when the burrs on the ventilating perforations are to be removed one by one, a disadvantage is presented that a tremendous labor and time are needed for reamer finishing of the multiplicity of ventilating perforations and the costs are raised as well.

The inventors of the present invention have found the above-described disadvantages as the result of studying the aforesaid techniques.

SUMMARY OF THE INVENTION

An object of the present invention is to provide powdery and granular material treating technique with simplified construction.

Another object of the present invention is to provide powdery and granular material treating technique with satisfactory and reliable sealing properties in the feeding-exhausting portions.

A further object of the present invention is to provide powdery and granular material treating technique with the costs being reduced.

The present invention is of such an arrangement that ventilating perforations are formed at least at portions of the outer periphery of the rotary drum and seal means of the feeding-exhausting portions of the rotary drum are in sliding contact with sliding frames.

According to the present invention, the feeding-exhausting portions are simplified in construction, the seal means for the feeding-exhausting portions of the rotary drum are not in direct contact with the perforated outer periphery of the drum, but in sliding contact with the sliding frames, whereby the seal means are not worn out and damaged by burrs and the like due to perforating of the rotary drum, so that reliable sealing can be stably effected.

The above-described and other objects, features and advantages of the present invention will become apparent more fully from the following description in conjunction with the accompanying drawings.

DETAILED DESCRIPTION OF THE PREFERRED EMBODIMENTS

Figure 1:
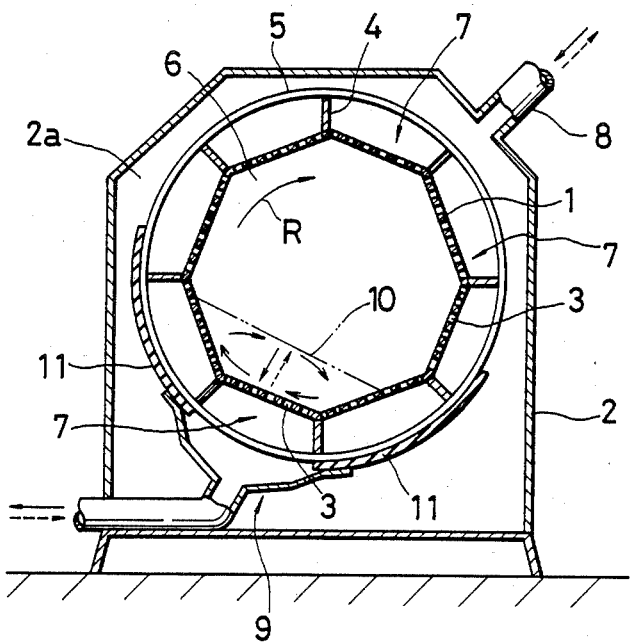
FIG. 1 is a schematic sectional view partially showing the powdery and granular material treating apparatus as being a first embodiment of the present invention.

Referring now to the drawings, in a powdery and granular material treating apparatus shown in FIG. 1, a rotary drum 1 containing therein powdery or granular material to be treated such as to be coated in this powdery and granular material treating apparatus is rotatably driven in a direction indicated by an arrow mark R in a closed type outer casing 2 by driving means such as a motor, not shown, through a rotary shaft, not shown, disposed at the central portion in an axial direction thereof. Furthermore, fed into the rotary drum 1 are powdered material, binder liquid and the like, which are for coating use. However, feeding nozzles for these are not shown for the sake of simplification.

The rotary drum 1 in this embodiment is of octagonal shape in section, and a multiplicity of perforations 3 are formed on the entire surface of the outer periphery of the drum in the rotating direction thereof by punching process or the like.

Partition plates (partition means) 4 are formed towards the outer sides from the vertexes of the octagonal shape on the outer periphery of the rotary drum 1. Two doughnut-shaped sliding frames 5 each being of a circular shape in section are mounted to the rotary drum 1 at axially opposite ends thereof and at the outer peripheral edges of these opposite ends. Needless to say, end plates 6 (Refer to FIG. 3) are provided on the axially opposite ends of the rotary drum 1.

A ventilating space 7 is constituted by a side of the outer peripheral surface of the rotary drum 1, the partition plates 4 and the sliding frames 5. More specifically, gas such as drying gas fed to and exhausted from the outer casing 2 through the feeding-exhausting portion 8 of the outer casing is fed to the interior or exhausted to the exterior of the rotary drum 1 through these ventilating spaces 7 from the interior of the outer casing 2.

On the other hand, the feeding-exhausting portion 9 for directly feeding or exhausting the gas such as the drying gas to/from the interior of the rotary drum 1 is provided at the outer side of a powdery or granular material tumbling bed portion 10, at a position corresponding to the lower left portion of the rotary drum 1 shown in FIG. 1. This feeding-exhausting portion 9 has seal 11 made of rubber or plastics being in sliding contact with the sliding frames 5 on the side of the outer periphery of the rotary drum 1 so as to prevent the gas fed to or exhausted from the interior and exterior of the rotary drum 1 from leaking out. These seal plates 11 are adapted to prevent the gas in a spaces 2a at the outer side of the rotary drum 1 in the outer casing 2 from leaking out into the feeding-exhausting portion 9 without contributing to drying by passing through the interior of the rotary drum 1.

This seal plate 11 is in sliding contact with the sliding frame 5 at axially opposite ends (Refer to FIG. 3) and is not in direct contact with the outer periphery of the rotary drum 1. Accordingly, the seal plate 11 can be prevented from being worn-out and damaged by the burrs formed when the ventilating perforations of the rotary drum 1 are formed by the punching process.

Action of this embodiment will hereunder be described.

For example, the rotary drum 1 containing therein the powdery or granular material such as tablets is rotated by the driving source such as the motor, not shown, in the direction indicated by an arrow mark R. At this time, the powdered material and the binder liquid are fed into the rotary drum 1 through the nozzles, not shown, and coated on the outer peripheries of the tablets tumbling in the rotary drum 1.

When it is desired to dry the tablets which have been finished in the coating treatment as described above or are still under the treatment, the drying gas is fed into the outer casing 2 from the feeding-exhausting portion 8 as indicated by solid lines in FIG. 1 for example.

The gas fed into the outer casing 2 is passed through the space 2a, the ventilating spaces 7 and the ventilating perforations 3 and delivered into the rotary drum 1. Then, the drying gas delivered into the rotary drum 1 is passed through layers of the tablets accumulated and tumbling in the powdery or granular material tumbling bed portion 10 to dry the tablets, thereafter, passed through the ventilating perforations 3 and the ventilating spaces 7, and exhausted into the feeding-exhausting portion 9.

In this embodiment, with this treatment, the ventilating perforations 3 are formed on the entire outer periphery of the rotary drum 1, so that the drying capacity of the rotary drum 1 can be enhanced.

Furthermore, in this embodiment, the seal plates 11 disposed between the rotary drum 1 and the feeding-exhausting portion 9 are not in direct contact with the outer peripheral surface of the rotary drum 1, but in sliding contact with the sliding frame 5, whereby the seal plates 11 are not worn out and damaged in the early stage, so that reliable sealing performance can be obtained stably for a long period of time. Accordingly, when the ventilating perforations 3 of the rotary drum 1 are formed by the punching process, necessity for removal of the burrs, which is troublesome and needs much labor, can be eliminated, and facilitated manufacturing and decreased costs can be achieved.

Figure 2:
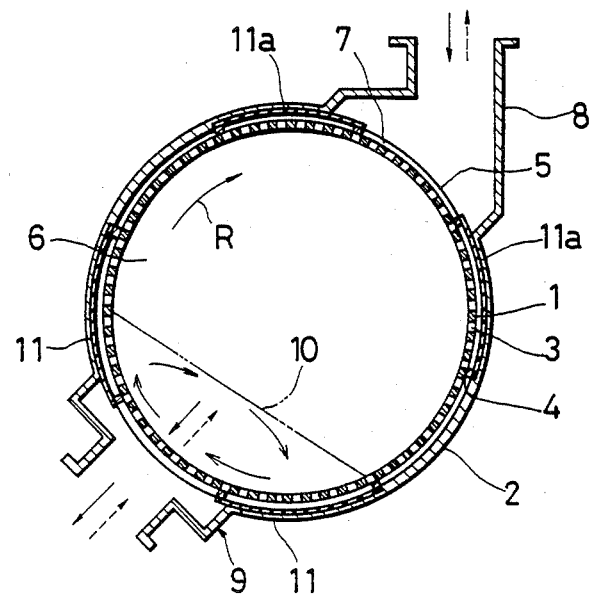
FIG. 2 is a schematic sectional view showing the powdery and granular material treating apparatus as being a second embodiment of the present invention.

FIG. 2 is the schematic sectional view showing the granular material treating apparatus as being the second embodiment of the present invention.

In this embodiment, the rotary drum 1 is formed into a circular shape in section and the outer casing 2 is formed into a circularly arcuate shape corresponding to the sectional shape of the rotary drum 1. Furthermore, the seal plates are provided not only on the side of the feeding-exhausting portion 9 (11) but also on the side of the feeding-exhausting portion 8 (11a).

In this embodiment also, the ventilating perforations 3 are formed on the entire outer periphery of the rotary drum 1, so that the drying capacity of the rotary drum 1 can be raised. Moreover, the seal plates 11 and 11a are in contact with the sliding frame 5, but not in contact with the outer periphery of the rotary drum 1, thereby achieving the advantages of preventing the seal plates 11 and 11a from being worn out and damaged and stably obtaining the reliable sealing performance.

Figure 3:
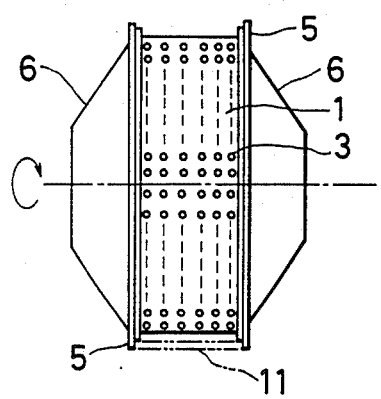
FIGS. 3 to 5 are schematic side views showing various embodiments of the rotary drum usable in the present invention.
Figure 4:
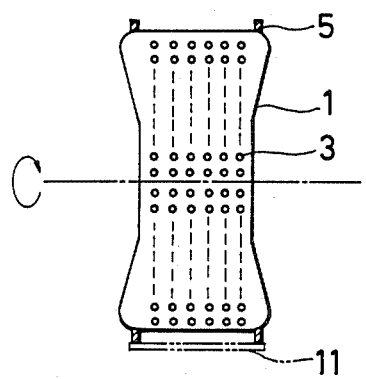
Figure 5:
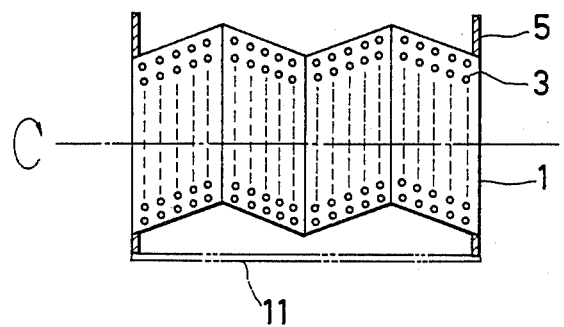

FIGS. 3 to 5 are schematic side views showing the various embodiments of the rotary drum usable in the present invention.

More specifically, there are shown odd-shaped embodiments of the rotary drum 1 including a rotary drum 1 shown in FIG. 3, having an outer shape of generally a bead on a Japanese abacus, another rotary drum 1 shown in FIG. 4, having an outer shape of generally an I letter, and a further rotary drum 1 shown in FIG. 5, having an outer shape, in which four cylinder each being circular in section are obliquely connected to one another.

Beside the rotary drum shown in FIG. 3, such advantages can be obtained in the one shown in FIG. 4 that the rotary drum is enlarged at portions close to the outer peripheries, so that the treating capacity can be increased. Furthermore, the rotary drum shown in FIG. 5 is eccentrically provided in an outer casing being of generally circular shape in section, whereby the powdery or granular material is eccentrically mixed up, so that a high mixing rate can be achieved.

On the other hand, FIGS. 6 to 11(b) are the schematic sectional views showing other various embodiments of the rotary drum usable in the present invention.

Figure 6:
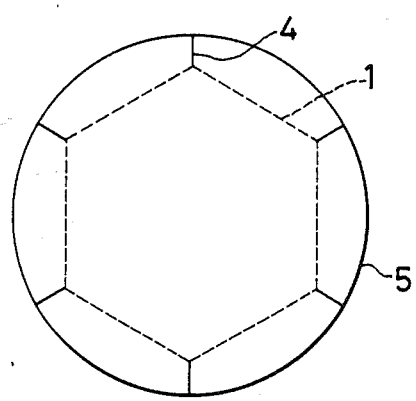
FIGS. 6 to 11(b) are schematic sectional views showing other various embodiments of the rotary drum usable in the present invention.
Figure 7:
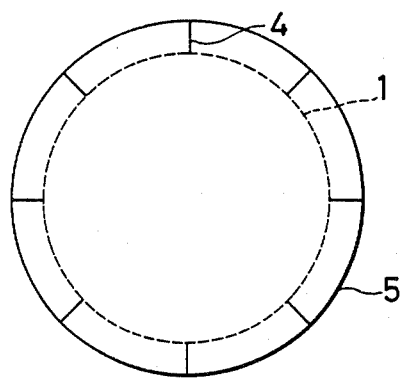
Figure 8:
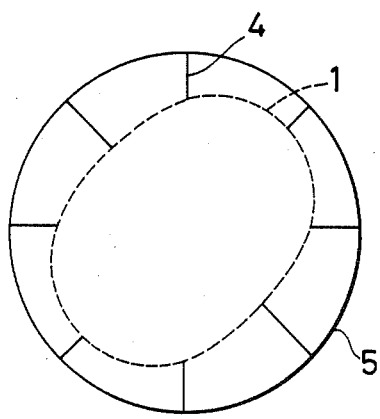
Figure 9:
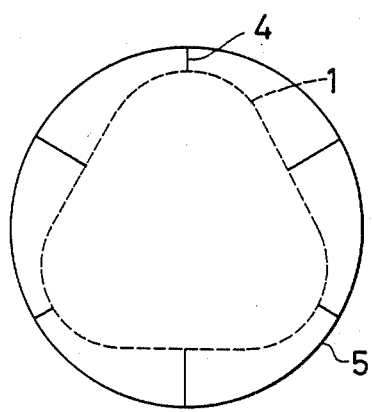
Figure 10:
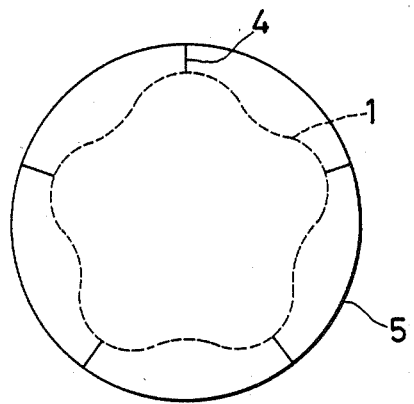
Figure 11A:
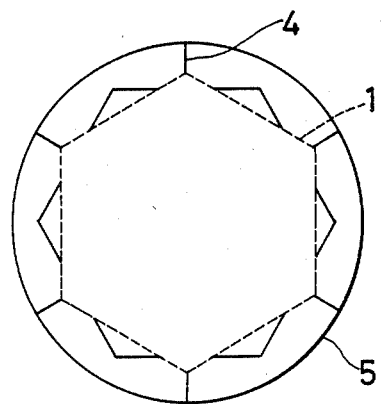
Figure 11B:
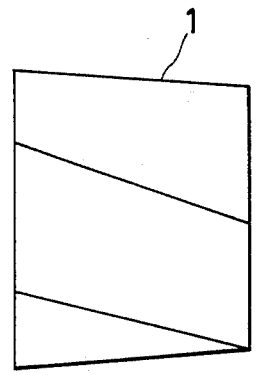

More specifically, a rotary drum 1 shown in FIG. 6 has a hexagonal shape, another rotary drum 1 shown in FIG. 7 has a circular shape, a further rotary drum 1 shown in FIG. 8 has an elliptical shape, a still further rotary drum 1 shown in FIG. 9 has a generally triangular shape or a rice ball shape, a still more further rotary drum 1 shown in FIG. 10 has a compound leaf shape, and yet further rotary drums 1 shown in FIGS. 11(a) and 11(b) have shapes of twisted hexagons.

Furthermore, the rotary drums 1 shown in FIGS. 6 to 11(b) have a plurality of partition plates 4.

Further, FIGS. 12 to 15 are the schematic sectional views showing further various embodiments of the rotary drum usable in the present invention.

In these various embodiments, portions of the outer periphery of the rotary drum 1 are directly, internally touching the inner periphery of the sliding frame 5 as partition means with the inner periphery of the sliding frame 5, and connected thereto by welding process or the like.

Figure 12:
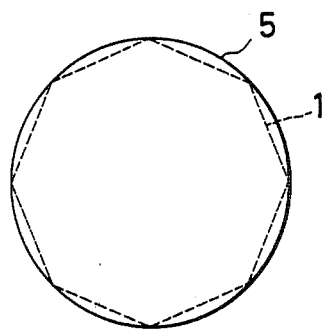
FIGS. 12 to 15 are schematic sectional views showing further various embodiments of the rotary drum usable in the present invention.
Figure 13:
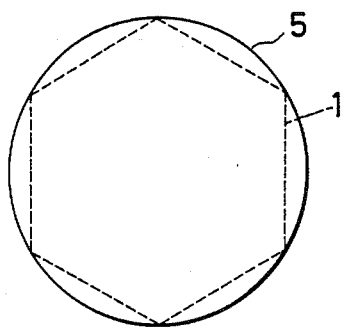
Figure 14:
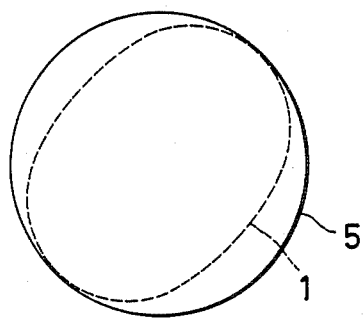
Figure 15:
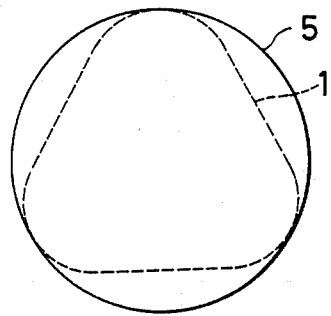

More specifically, in case of the octagonal shape of the rotary drum 1 shown in FIG. 12 or the hexagonal shape of the rotary drum 1 shown in FIG. 13, the rotary drums 1 are internally touching the inner periphery of the sliding frame 5 at the vertex portions of the respective polygonal shapes, and connected thereto. Furthermore, in case of the elliptical shape of the rotary drum 1 shown in FIG. 14 or the generally triangular shape or the rice ball shape of the rotary drum 1 shown in FIG. 15, portions of the rotary drums 1, which project towards the outer peripheries thereof, are internally touching the sliding frame 5 and connected thereto, respectively.

In case of any of the rotary drum shapes as described above, the intended objects of the present invention can be achieved.

Incidentally, the present invention is not limited to the above embodiments, and other various modifications can be adopted.

For example, the shape of the rotary drum may be one other than the ones shown above, and the ventilating perforations may be formed not only on the entire surface of the outer periphery of the rotary drum but also on the substantially entire surfaces or at least on some portions.

Furthermore, the sliding frames are not limited to the doughnut shape, but, may be formed into ring shapes. In this case, as shown in FIG. 16, axially opposite ends of the ring-shaped sliding frames 5a may be closed by the end plates 6 for blocking the axially opposite ends of the rotary drum 1.

Figure 16:
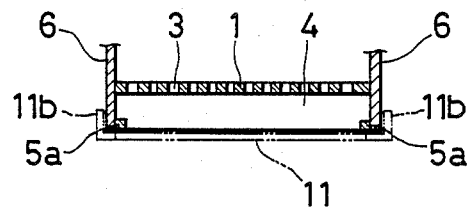
FIG. 16 is a sectional view partially showing another embodiment of the sliding frame.

Further, opposite end portions 11b of the seal plate 11 (and 11a) may be formed into generally U-shaped cross sections in a manner to seal in sliding contact with the end plates 6 as indicated by two-dot chain lines in FIG. 16 or to seal in sliding contact with the side surfaces of the outer peripheries of the sliding frame 5 as shown in FIG. 1. Particularly, in case of the former, the end plates 6 and the like can perform the function as the sliding frame, so that the sliding frame can be dispensed with.

Incidentally, the present invention is widely applicable as various powdery and granular material treating apparatus such as a drying apparatus, a granulation apparatus and a mixing apparatus, in addition to the coating apparatus.

The present invention can offer the following advantages.

(1) The apparatus according to the present invention comprises: the rotary drum formed at least at portions of the outer periphery thereof with the ventilating perforations; the sliding frames provided on the sides of the outer periphery of this rotary drum, with which the seal means for the gas fed to or exhausted from the rotary drum are in sliding contact; and the partition means provided on the side of the outer periphery of the rotary drum at positions spaced apart in the circumferential direction of the rotary drum from one another; so that the powdery and granular material treating apparatus simplified in construction can be obtained.

(2) From item (1) as described above, the seal means are not in direct contact with the outer periphery of the rotary drum, but are in sliding contact with the sliding frames, so that the seal means are free from the worn-out and damages caused by sliding contact with the burrs formed on the rotary drum, and the reliable sealing performance can be stably obtained.

(3) From item (2) as described above, necessity of the troublesome and labor taking work for the burr-removing from the rotary drum can be eliminated, so that facilitated manufacturing of the rotary drum and reduced costs can be achieved.

(4) From item (1) as described above, the cost of the powdery and granular material treating apparatus as a whole can be reduced.

(5) From the combined effects of the aforesaid items (1) to (4), the powdery and granular material treating apparatus satisfactory in terms of the performance and cost can be obtained.

(6) When the ventilating perforations are formed on the entire surface or the substantially entire surface of the outer periphery of the rotary drum, the drying capacity of the apparatus can be increased.

What is claimed is:

1. A powdery and granular material treating apparatus comprising:
   a rotary drum formed at least at one portion of the outer periphery thereof with ventilating perforations;
   seal means for gas fed to or exhausted from said rotary drum;
   sliding frames provided on the sides of the outer periphery of said rotary drum, said sliding frames being in sliding contact with said seal means; and
   partition means provided on the side of the outer periphery of said rotary drum at positions spaced apart equidistantly in the circumferential direction of said rotary drum from one another;
   said sliding frames each being of a circular outer shape, provided on the sides of the outer peripheral edges at axially opposite ends of said rotary drum;
   said seal means, being in sliding contact with said sliding frames at portions for feeding gas to or exhausting gas from said rotary drum, prevents gas from leaking through said portions; and
   said rotary drum, sliding frame, and partition means define a plurality of ventilating spaces, through which gas is fed to or exhausted from said drum when one of said ventilating spaces comes to said positions for feeding gas to or exhausting gas from said rotary drum by rotating said rotary drum, sliding frame, and partition means all together.

2. A powdery and granular material treating apparatus as set forth in claim 1, wherein said ventilating perforations are formed on the entire surface or the substantially entire surface of said rotary drum.

3. A powdery and granular material treating apparatus as set forth in claim 1, wherein said rotary drum has a polygonal shape in section.

4. A powdery and granular material treating apparatus as set forth in claim 1, wherein said rotary drum has a circular shape of being round or out of round in section.

5. A powdery and granular material treating apparatus as set forth in claim 1, wherein said rotary drum, said seal means, said sliding frames and said partition means are housed in an outer casing.

6. A powdery and granular material treating apparatus as set forth in claim 1, wherein said seal means are provided at both inlet and outlet of gas, through which the gas is fed to or exhausted from said rotary drum.

7. A powdery and granular material treating apparatus as set forth in claim 1, wherein said seal means are provided in said outer casing and the inner surfaces of said seal means are in sliding contact with the outer surfaces of said sliding frames.

8. A powdery and granular material treating apparatus as set forth in claim 1, wherein said sliding frame has a doughnut shape.

9. A powdery and granular material treating apparatus as set forth in claim 1, wherein said sliding frame has a ring shape and axially opposite ends of said ringshaped sliding frame are closed by end plates for blocking axially opposite ends of said rotary drum.

10. A powdery and granular material treating apparatus as set forth in claim 1, wherein opposite side portions of said seal means are bent inwardly in the radial direction in such a manner to seal in sliding contact with the side surfaces of end plates for blocking axially opposite ends of said rotary drum.

11. A powdery and granular material treating apparatus as set forth in claim 1, wherein opposite end portions of said seal means are bent inwardly in the radial direction of the rotary drum in such a manner to seal in sliding contact with the side surface of the outer periphery of said sliding frames.

* * * * *